(12) United States Patent
Lu et al.

(10) Patent No.: US 12,308,747 B2
(45) Date of Patent: May 20, 2025

(54) CONTROL METHOD AND POWER CONTROLLER FOR FLYBACK POWER CONVERTER

(71) Applicant: Leadtrend Technology Corporation, Zhubei (TW)

(72) Inventors: Hsin Hung Lu, Zhubei (TW); San-Yi Li, Zhubei (TW); Hung-Ting Hsu, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 254 days.

(21) Appl. No.: 18/067,846

(22) Filed: Dec. 19, 2022

(65) Prior Publication Data

US 2023/0344356 A1 Oct. 26, 2023

(30) Foreign Application Priority Data

Apr. 21, 2022 (TW) .................................. 111115296

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 1/0025* (2021.05)

(58) Field of Classification Search
CPC ................................................ H02M 3/33523
See application file for complete search history.

(56) References Cited

U.S. PATENT DOCUMENTS

| 7,239,532 | B1 * | 7/2007 | Hsu | H02M 3/33523 |
| | | | | 363/21.16 |
| 2009/0147546 | A1 * | 6/2009 | Grande | H02M 3/33523 |
| | | | | 363/21.16 |
| 2010/0165666 | A1 * | 7/2010 | Wang | H02M 3/33523 |
| | | | | 363/21.01 |
| 2013/0083565 | A1 * | 4/2013 | Gaknoki | H02M 1/08 |
| | | | | 363/21.17 |
| 2013/0336022 | A1 * | 12/2013 | Zhang | G11C 27/024 |
| | | | | 363/21.17 |

(Continued)

FOREIGN PATENT DOCUMENTS

| CN | 101567633 A | * | 10/2009 | ........ H02M 3/33523 |
| CN | 102684503 A | * | 9/2012 | ........ H02M 3/33507 |

(Continued)

*Primary Examiner* — Sisay G Tiku
(74) *Attorney, Agent, or Firm* — McClure, Qualey & Rodack, LLP

(57) ABSTRACT

A control method is disclosed to have a voltage sample capable of more correctly representing an output voltage of a power converter. The power converter has a primary side and a secondary side galvanically isolated from each other. A feedback voltage is received in the primary side. A main power switch is turned OFF, starting an OFF time, during which the feedback voltage is constrained in response to the voltage sample. In a sampling time within the OFF time, the feedback voltage is sampled to update the voltage sample representing the output voltage in the secondary side. A driving signal is provided in response to the voltage sample to control the main power switch.

13 Claims, 6 Drawing Sheets

(56) References Cited

U.S. PATENT DOCUMENTS

| | | | | |
|---|---|---|---|---|
| 2015/0028821 A1* | 1/2015 | Lu | ................. | H02M 1/4225 |
| | | | | 323/208 |
| 2016/0268907 A1* | 9/2016 | Chen | ................. | H02M 3/33507 |
| 2017/0077820 A1* | 3/2017 | Lu | ................. | H02M 3/33523 |
| 2018/0062527 A1* | 3/2018 | Lu | ................. | H02M 3/18 |
| 2018/0234013 A1* | 8/2018 | Lu | ................. | H02M 3/33507 |
| 2020/0036290 A1* | 1/2020 | Yang | ................. | H02M 3/24 |
| 2021/0328500 A1* | 10/2021 | Lu | ................. | H02M 1/0025 |
| 2023/0170781 A1* | 6/2023 | Chou | ................. | H02M 3/33571 |
| | | | | 323/282 |
| 2023/0179101 A1* | 6/2023 | Li | ................. | H02M 3/33523 |

FOREIGN PATENT DOCUMENTS

| | | | | |
|---|---|---|---|---|
| CN | 110364994 A | * | 10/2019 | ........... H02H 7/1213 |
| CN | 211151798 U | * | 7/2020 | ....... G01R 19/16538 |
| WO | WO-2018046776 A1 | * | 3/2018 | |

\* cited by examiner

CONTROL METHOD AND POWER CONTROLLER FOR FLYBACK POWER CONVERTER

CROSS-REFERENCE TO RELATED APPLICATION

This application claims priority to and the benefit of Taiwan Patent Application Number 111115296 filed on Apr. 21, 2022, which is incorporated by reference in its entirety.

BACKGROUND

The present disclosure relates generally to a flyback power converter, and more particularly to a control method and a power controller in use of a flyback power converter employing primary side regulation.

Flyback topology is well known in the art of power conversion because of simplicity in structure and galvanic isolation between primary and secondary sides, and is commonly adapted by power suppliers with low or middle output power. A flyback power converter normally has a power controller, which controls a main power switch to make an input power source in a primary side energize a transformer, and to release the energy stored in the transformer to an output power source in a secondary side. The amount of energy stored or released must be well controlled to regulate the output voltage of the output power source.

Conventionally, there are two different methods that a flyback power converter may employ to regulate the output voltage of an output power source: PSR (primary side regulation) and SSR (secondary side regulation). For PSR, a power controller in a primary side timely detects a reflective voltage of a transformer where the reflective voltage can represent the output voltage, so as to regulate the output voltage. For SSR, detection circuitry in a secondary side directly detects the output voltage, and feeds the detection result via an isolation device, such as a photo coupler, a capacitor, another transformer for example, back to a power controller in a primary side, which according regulates the amount of energy stored in a transformer.

In view of BOM (bill of material), PSR is preferable, because PSR does not need the detection circuitry that SSR required in a secondary side. Nevertheless, for PSR, the reflective voltage can represent the output voltage only under certain conditions. It is always a challenge for the designer of a power controller to accurately and correctly detect the output voltage in a flyback power converter using PSR.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
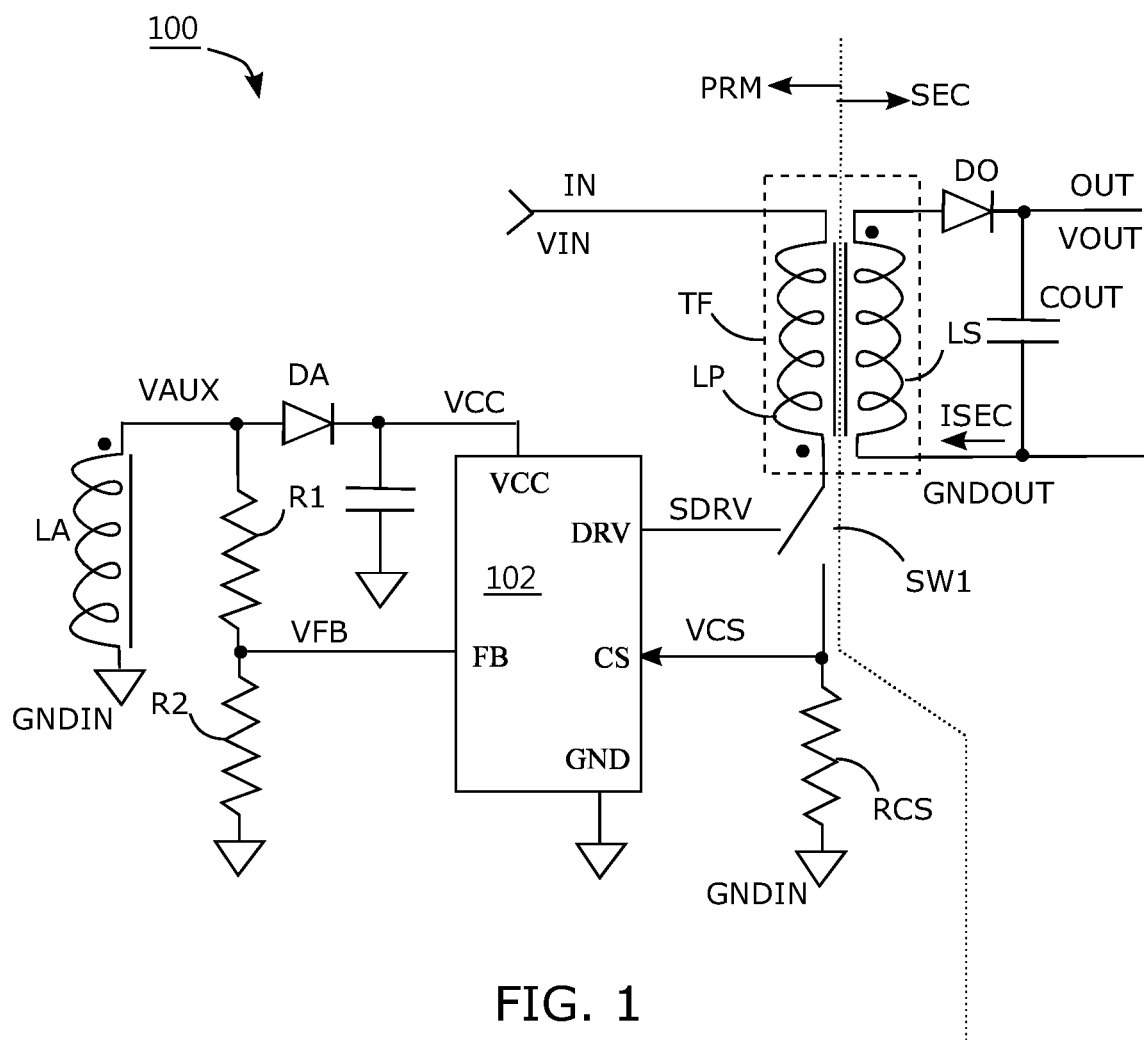
FIG. 1 demonstrates a flyback power converter using PSR.

FIG. 1 demonstrates flyback power converter 100 using PSR, having primary side PRM and secondary side SEC galvanically isolated from each other. In primary side PRM, primary winding LP of transformer TF, main power switch SW1, and current-sense resistor RCS are connected in series between input power line IN and input ground line GNDIN. Power controller 102 provides driving signal SDRV to turn ON and OFF main power switch SW1. In secondary side SEC, secondary winding LS of transformer TF and rectifier diode D0 are connected in series between output power line OUT and output ground line GNDOUT. Transformer TF further has auxiliary winding LA, one end of which has winding voltage VAUX. A voltage divider, consisting of resistors R1 and R2 for example, is connected in parallel with auxiliary winding LA, to provide feedback voltage VFB to feedback node FB of power controller 102.

When driving signal SDRV turns ON main power switch SW1 to perform a short circuit, it is ON time TON, and input voltage VIN at input power line IN energizes primary winding LP and transformer TF as well. When driving signal SDRV turns OFF main power switch SW1 to perform an open circuit, it is OFF time TOFF, and the electromagnetic energy stored in transformer TF starts releasing to induce secondary-side current ISEC which flows from secondary winding LS through rectifier diode D0, so as to charge output capacitor COUT and build up output voltage VOUT at output power line OUT. Output voltage VOUT can supply power to a load (not shown in FIG. 1).

Figure 2:
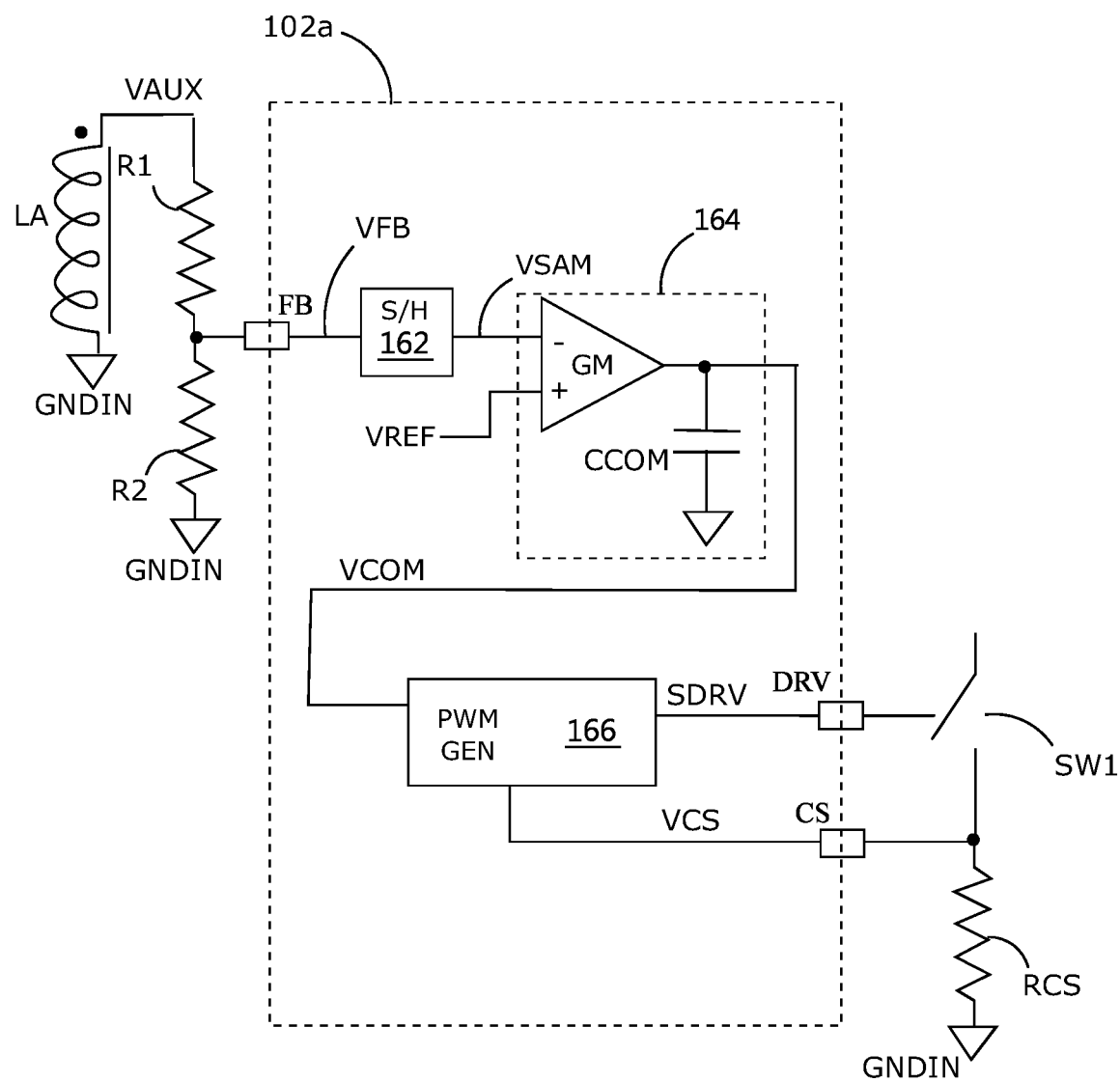
FIG. 2 shows a power controller.

FIG. 2 shows power controller 102a, capable of being used as power controller 102 in FIG. 1. Power controller 102a has sampler 162, compensation circuit 164, and pulse-width-modulator 166. Sampler 162 samples feedback voltage VFB to update and hold voltage sample VSAM. Compensation circuit 164 has transconductor GM and compensation capacitor CCOM. Transconductor GM compares voltage sample VSAM with target voltage VREF to charge or discharge compensation capacitor CCOM, on which compensation voltage VCOM is accordingly built. In response to compensation voltage VCOM and current-sense signal VCS at current-sense node CS, pulse-width-modulator 166 provides driving signal SDRV at driving node DRV to control ON time TON and/or the switching frequency of main power switch SW1. Compensation circuit 164 and pulse-width-modulator 166 cooperatively provide driving signal SDRV in response to voltage sample VSAM to control main power switch SW1. For example, if voltage sample VSAM is higher than target voltage VREF, implying that output voltage VOUT is currently higher than wanted, transconductor GM accordingly lowers compensation voltage VCOM, pulse-width-modulator 166 shortens ON time TON of power switch SW1, the electromagnetic energy stored in transformer TF and released to output capacitor COUT lessens, so output voltage VOUT tends to decrease.

Figure 3:
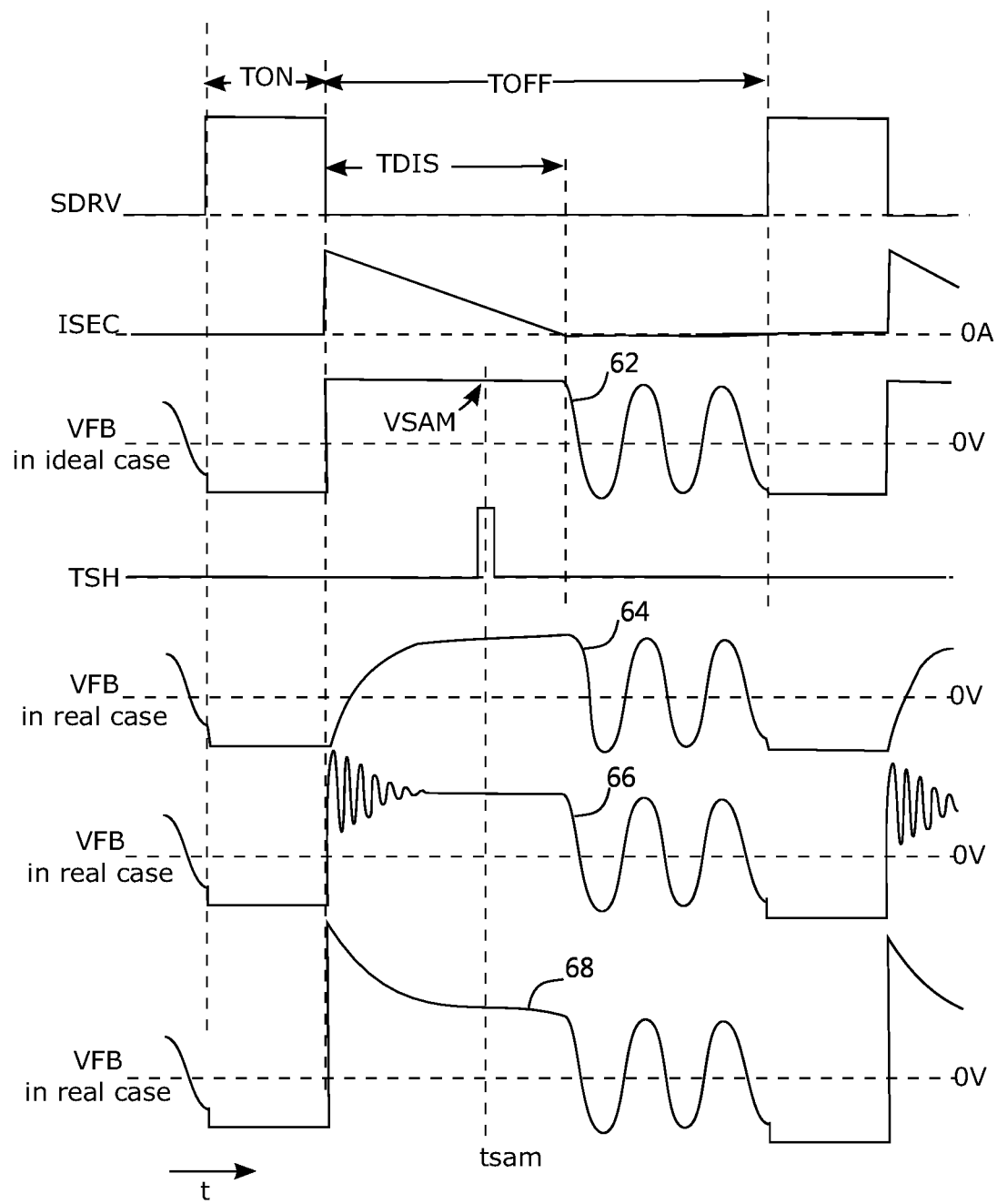
FIG. 3 demonstrates waveforms of signals of FIGS. 1 and 2.

FIG. 3 demonstrates waveforms of signals of FIGS. 1 and 2, including driving signal SDRV of FIG. 2, secondary-side current ISEC of FIG. 1, feedback voltage VFB of FIG. 2 in an ideal case, sampling pulse TSH generated by sampler 162 in FIG. 2, and feedback voltages VFB of FIG. 2 that might happen in three different real cases respectively.

ON time TON is a period of time when main power switch SW1 is turned ON by driving signal SDRV, and, in the opposite OFF time TOFF is another period of time when main power switch SW1 is turned OFF, as shown in FIG. 3. Starting with the beginning of OFF time TOFF, transformer TF releases the electromagnetic energy stored to induce secondary-side current ISEC charging output capacitor COUT. The period of time when secondary-side current ISEC is positive is referred to as discharge time TDIS of transformer TF, as demonstrated in FIG. 3. According to some embodiments of the invention, discharge time TDIS of transformer TF might refer to the period from the beginning of OFF time TOFF to the moment when feedback voltage VFB fails across 0V. It can be seen from waveform 62 in FIG. 3 that during discharge time TDIS feedback voltage VFB in an ideal case is about of a constant that reflects output voltage VOUT, so sampler 162 samples feedback voltage VFB when sample pulse TSH appears during sampling time tsam, to update and provide voltage sample VSAM in FIG. 2, equivalently detecting output voltage VOUT.

Nevertheless, feedback voltage VFB in a real case differs from that in an ideal case, as shown in FIG. 3. Unlike waveform 62 in FIG. 3, waveforms 64, 66, and 68 show that feedback voltage VFB in a real case might not be of a constant during discharge time TDIS. Feedback voltage VFB in the beginning of discharge time TDIS in a real case might overshoot, undershoot, or vibrate due to parasitic resistance, capacitance or inductance, and it might take a long time for feedback voltage VFB to stabilize and to be capable of reflecting output voltage VOUT, as demonstrated by waveforms 64, 66, and 68 in FIG. 3. Therefore, the timing of sampling time tsam is critical. If sampling time tsam appears before feedback voltage VFB becomes stable, voltage sample VSAM does not represent output voltage VOUT correctly, and output voltage VOUT can not be well regulated. In some circumstances, discharge time IDIS itself is so brief that feedback voltage VFB can not stabilize before the end of discharge time IDIS, and as a result voltage sample VSAM can never be a good representative of output voltage VOUT no matter when sampling time tsam appears.

Figure 4:
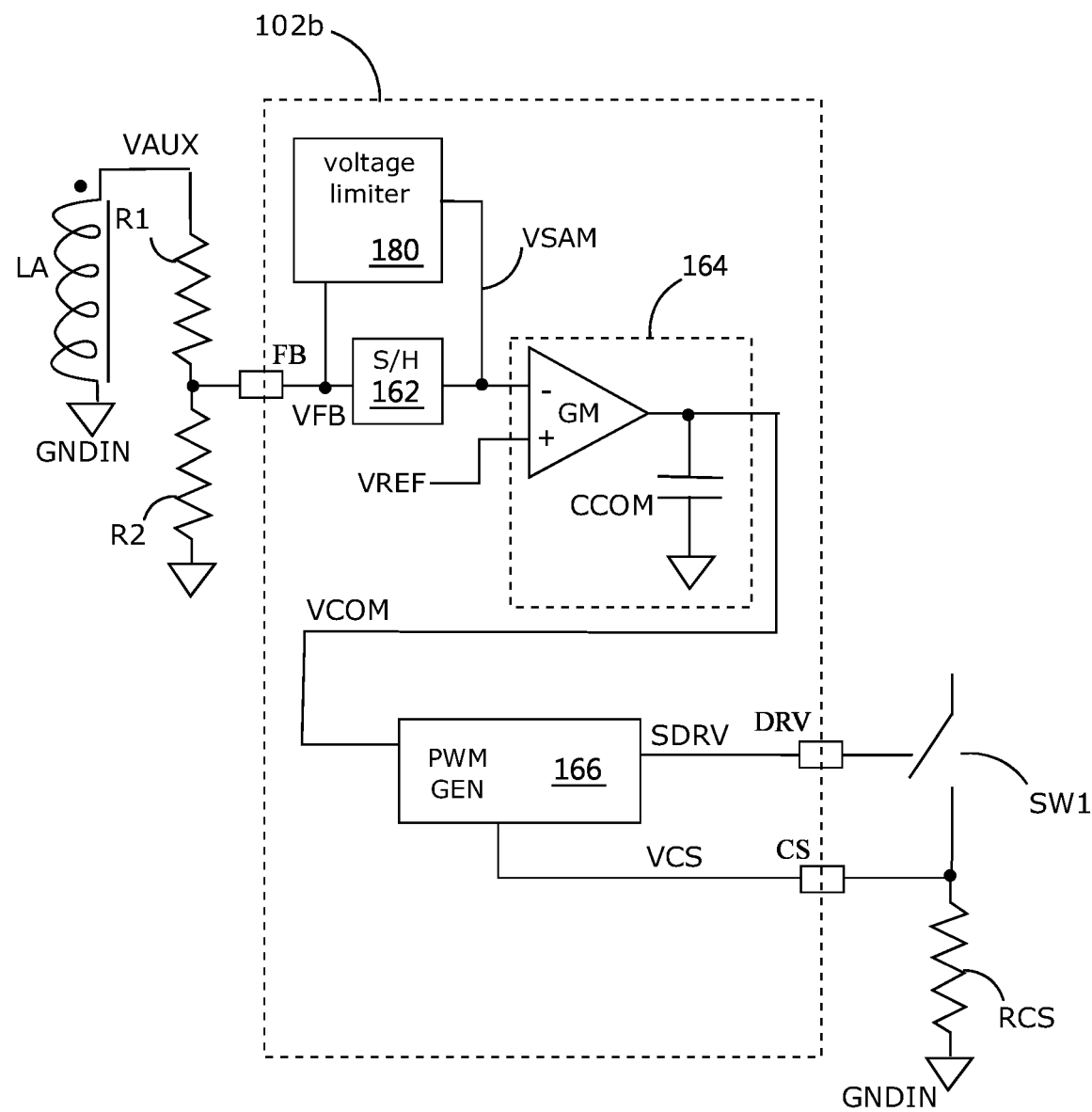
FIG. 4 shows a power controller according to embodiments of the invention.

FIG. 4 shows power controller 102b according to embodiments of the invention. Power controller 102b can be used as power controller 102 in FIG. 1. Some parts or portions in FIG. 4 are the same or similar with corresponding parts or portions in FIG. 2, and are self-explanatory in view of the teaching of FIG. 2. In comparison with power controller 102a in FIG. 2, power controller 102b in FIG. 4 has voltage limiter 180 in addition, which connects to feedback node FB and controls feedback voltage VFB in response to voltage sample VSAM. Voltage limiter 180 constrains feedback voltage VFB to be in a predetermined condition in association with voltage sample VSAM.

Figure 5:
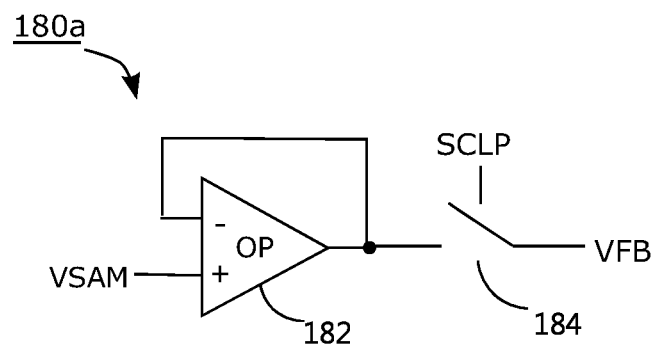
FIG. 5 demonstrates a voltage limiter according to embodiments of the invention.

FIG. 5 demonstrates voltage limiter 180a, including operational amplifier 182 and switch 184. Configured to be a unity-gain buffer, operational amplifier 182 duplicates at its output the voltage value of voltage sample VSAM. Switch 184 controls the connection between the output of operational amplifier 182 and feedback node FB. Simply speaking, voltage limiter 180a presets feedback voltage VFB to be substantially equal to voltage sample VSAM if switch 184 shorts the output of operational amplifier 182 and feedback node FB. Clamp signal SCLP turns on switch 184 during clamping time TCLP, so operational amplifier 182 forces feedback voltage VFB to have a voltage value substantially equal to voltage sample VSAM.

Figure 6:
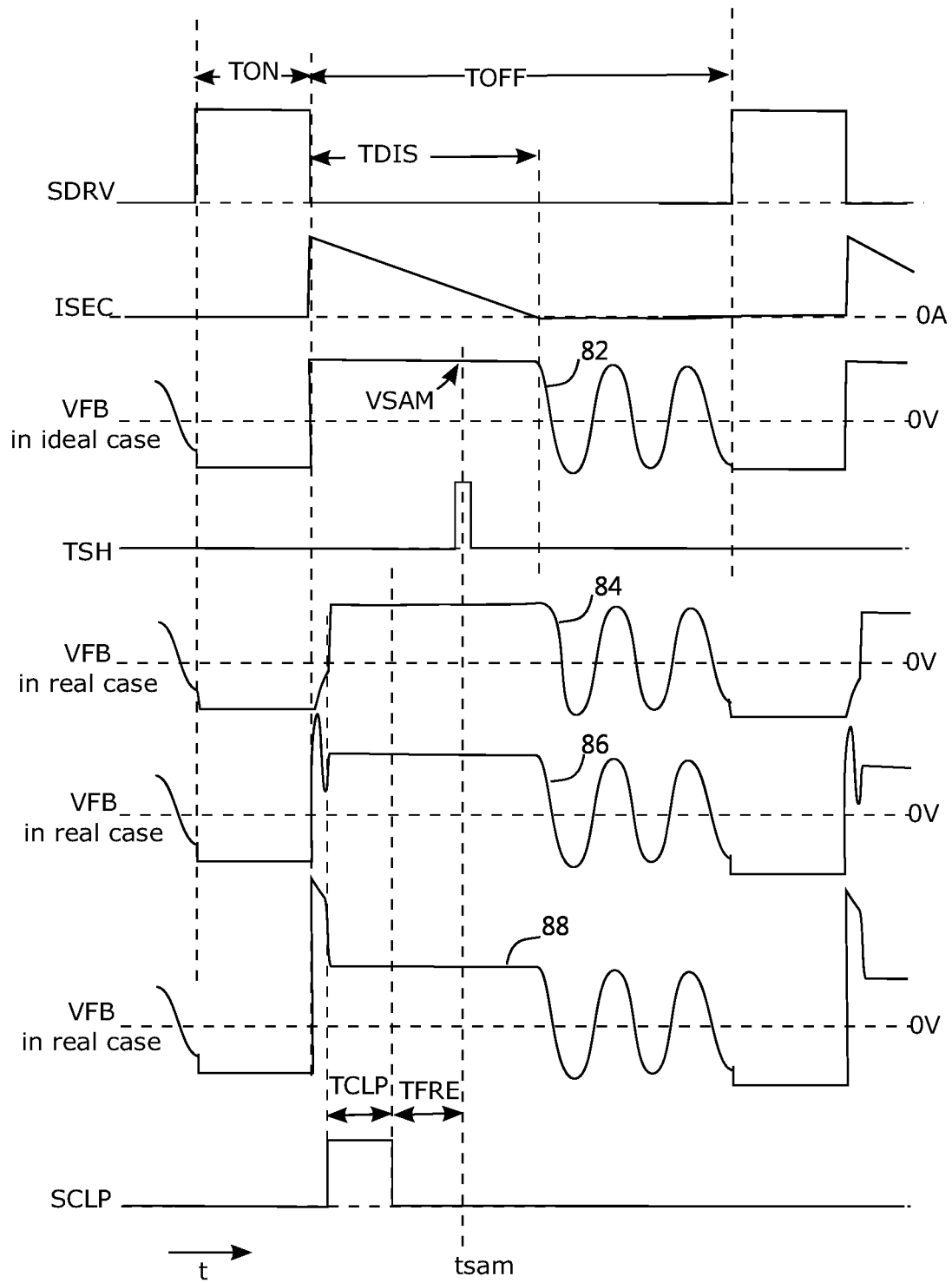
FIG. 6 demonstrates waveforms of signals of FIGS. 1, 4 and 5.

FIG. 6 demonstrates waveforms of signals of FIGS. 1, 4 and 5, including driving signal SDRV of FIG. 4, secondary-side current ISEC of FIG. 1, feedback voltage VFB of FIG. 4 in an ideal case, sampling pulse TSH generated by sampler 162 in FIG. 4, three feedback voltages VFB of FIG. 4 that might happen in three different real cases respectively, and clamp signal SCLP defining clamping time TCLP. Some parts or portions in FIG. 6 are the same or similar with corresponding parts or portions in FIG. 3, and are self-explanatory in view of the teaching of FIG. 3. In comparison with FIG. 3, each waveform of feedback voltages VFB in FIG. 6 in real cases converges and stabilizes much more quickly, and causes to have voltage sample VSAM much more reliable. From the waveforms shown in FIG. 6, clamping time TCLP starts soon after the beginning of OFF time TOFF, and relaxation time TFRE refers to the period between clamping time TCLP and sampling time tsam. Clamping time TCLP as shown in FIG. 6 is ahead of sampling time tsam. As demonstrated by waveforms 84, 86 and 88, each being the waveform of feedback voltage VFB in a real case, during clamping time TCLP voltage limiter 180a presets feedback voltage VFB to be substantially equal to voltage sample VSAM. During relaxation time TFRE following clamping time TCLP, voltage limiter 180a constrains feedback voltage VFB no more, so feedback voltage VFB is released to be driven by auxiliary winding LA, and the voltage divider with resistors R1 and R2, reflecting output voltage VOUT. Possible overshooting, undershooting or vibration that are shown in FIG. 4 can be mostly suppressed by voltage limiter 180a which equivalently sets the initial condition of feedback voltage VFB during off time TOFF. Accordingly, voltage sample VSAM that sampler 162 updates and holds at sampling time tsam can represent output voltage VOUT more correctly.

According to an embodiment of the invention, each of clamping time TCLP and relaxation time TFRE is about one third of discharge time TDIS. Based on an embodiment of the invention, in a switching cycle power controller 102b records length LEN of discharge time IDIS of transformer TF, and in the next switching cycle takes a beginning portion of OFF time TOFF whose length is about one third of length LEN as clamping time TCLP, during which voltage limiter 180a constrains feedback voltage VFB.

Figure 7:
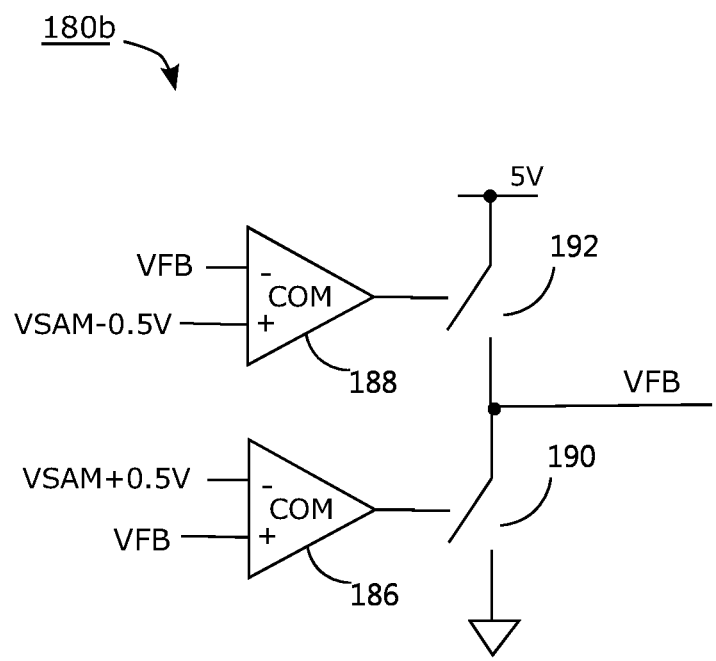
FIG. 7 demonstrates another voltage limiter according to embodiments of the invention.

Even though voltage limiter 180a in FIG. 5 presets feedback voltage VFB during clamping time TCLP, but this invention is not limited to. FIG. 7 demonstrates voltage limiter 180b, having comparators 186, 188, and switches 190, 192. Simply speaking, voltage limiter 180b substantially limits feedback voltage VFB within a predetermined range covering voltage sample VSAM. For instance, this predetermined range is between voltage sample VSAM minus 0.5V and voltage sample VSAM plus 0.5V. When feedback voltage VFB exceeds voltage sample VSAM plus 0.5V, comparator 186 turns ON switch 190, pulling down feedback voltage VFB; and when feedback voltage VFB becomes below voltage sample VSAM minus 0.5V, comparator 188 turns ON switch 192, pulling up feedback voltage VFB. In other words, when voltage limiter 180 activates, feedback voltage VFB can change or vary only within the 1-volt range centering on voltage sample VSAM. According to one embodiment of the invention, voltage limiter 180 activates only during OFF time TOFF before sampling time tsam, and deactivates otherwise not to affect feedback voltage VFB. Limiting feedback voltage VFB in a predetermined range, voltage limiter 180b can prevent feedback voltage VFB from being too far away from voltage sample VSAM because of possible overshooting, undershooting or vibration, and feedback voltage VFB can quickly converge to more reliably reflect output voltage VOUT.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a power converter with a primary side and a secondary side galvanically isolated from each other, the control method comprising:
   receiving a feedback voltage in the primary side;
   turning OFF a main power switch to start an OFF time; and
   during a first period within the OFF time, constraining the feedback voltage in response to a voltage sample;
   in a sampling time within the OFF time, sampling the feedback voltage to update the voltage sample, wherein the voltage sample represents an output voltage in the secondary side; and
   providing a driving signal in response to the voltage sample to control the main power switch;
   wherein the first period is ahead of the sampling time.

2. The control method as claimed in claim 1, comprising: presetting the feedback voltage to be equal to the voltage sample.

3. The control method as claimed in claim 1, comprising: recording a discharge time of a transformer of the power converter;
   wherein the first period has a first length proportional to a second length of the discharge time.

4. The control method as claimed in claim 1, wherein the power converter comprises a transformer with a primary winding, a secondary winding, and an auxiliary winding, and the feedback voltage is provided by a voltage divider connected to the auxiliary winding.

5. A control method in use of a power converter with a primary side and a secondary side galvanically isolated from each other, the control method comprising:
   receiving a feedback voltage in the primary side;
   turning OFF a main power switch to start an OFF time; and
   in the OFF time, limiting the feedback voltage to be within a predetermined range determined based on a voltage sample;
   in a sampling time within the OFF time, sampling the feedback voltage to update the voltage sample, wherein the voltage sample represents an output voltage in the secondary side; and
   providing a driving signal in response to the voltage sample to control the main power switch.

6. The control method as claimed in claim 5, wherein the predetermined range centers on the voltage sample.

7. A power controller in use of a power converter with a primary side and a secondary side galvanically isolated from each other, the power controller comprising:
   a sampler sampling a feedback voltage in the primary side to update a voltage sample, wherein the voltage sample represents an output voltage in the secondary side;
   a compensation circuit, comparing the voltage sample with a target voltage to provide a compensation voltage;
   a pulse-width-modulator providing a driving signal to control a main power switch in response to the compensation voltage; and
   a voltage limiter constraining the feedback voltage in response to the voltage sample;
   wherein the voltage limiter comprises:
      a unity-gain buffer; and
      a switch connected to an output of the unity-gain buffer;
      wherein the switch is turned ON in a first period, so the unity-gain buffer makes the feedback voltage equal to the voltage sample.

8. The power controller as claimed in claim 7, wherein the voltage limiter presets feedback voltage equal to the voltage sample.

9. The power controller as claimed in claim 7, wherein the main power switch is turned ON and OFF during an ON time and an OFF time respectively, the sampler samples the feedback voltage in a sampling time within the OFF time, the voltage limiter constrains the feedback voltage in the first period within the OFF time, and the first period is ahead of the sampling time.

10. The power controller as claimed in claim 9, wherein the power controller records a discharge time of a transformer of the power converter; and the first period has a first length proportional to a second length of the discharge time.

11. The power controller as claimed in claim 7, wherein the power converter includes a transformer with a primary winding, a secondary winding, and an auxiliary winding, the main power switch is connected to the primary winding, and the feedback voltage is provided by a voltage divider connected to the auxiliary winding.

12. A power controller in use of a power converter with a primary side and a secondary side galvanically isolated from each other, the power controller comprising:

a sampler sampling a feedback voltage in the primary side to update a voltage sample, wherein the voltage sample represents an output voltage in the secondary side;
a compensation circuit, comparing the voltage sample with a target voltage to provide a compensation voltage;
a pulse-width-modulator providing a driving signal to control a main power switch in response to the compensation voltage; and
a voltage limiter constraining the feedback voltage in response to the voltage sample;
wherein the voltage limiter limits the feedback voltage to be within a predetermined range determined based on the voltage sample.

13. The power controller as claimed in claim 12, wherein the predetermined range centers on the voltage sample.

* * * * *